April 21, 1931.  G. F. COLBERT ET AL  1,802,170
ORNAMENTAL COMPOSITE GLASS

Filed March 13, 1930

INVENTORS

Patented Apr. 21, 1931

1,802,170

UNITED STATES PATENT OFFICE

GEORGE F. COLBERT AND WILLIAM H. COLBERT, OF PITTSBURGH, PENNSYLVANIA, ASSIGNORS TO LIBERTY MIRROR WORKS, A CORPORATION OF PENNSYLVANIA

ORNAMENTAL COMPOSITE GLASS

Application filed March 13, 1930. Serial No. 435,523.

Figure 1:
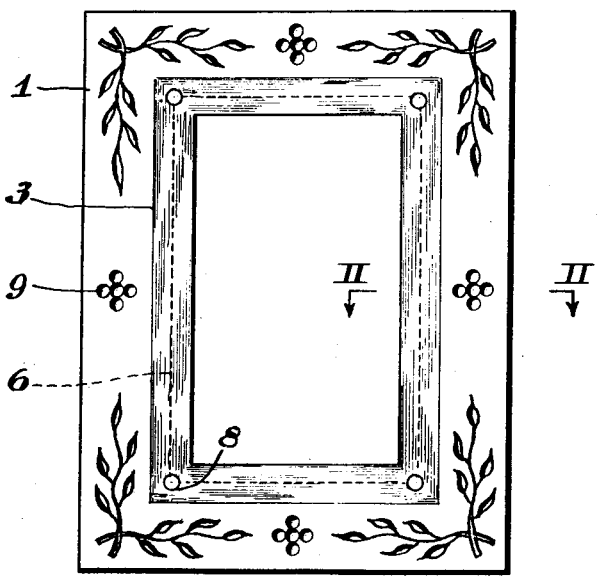
Figure 2:
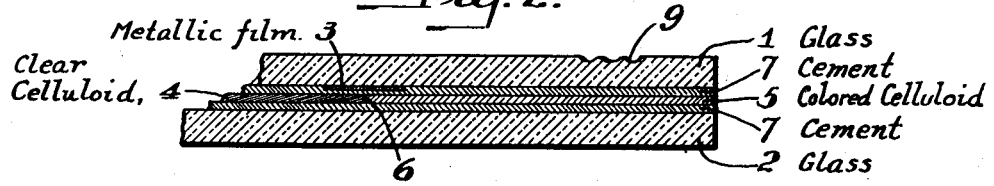
Figure 3:
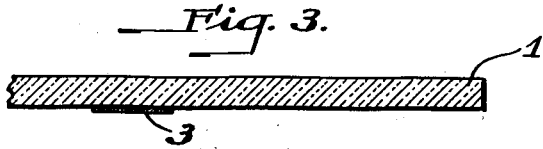
Figure 4:
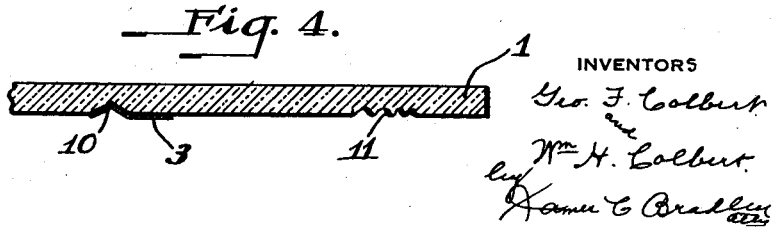

The invention relates to ornamental composite glass for use as a mounting for a photograph or for use in any relation where a composite plate of ornamental appearance employing two or more colors for the reinforcing is desirable. When used as a mounting for a photograph or other picture, the object is to provide a plate of highly ornamental appearance having a colored border portion and constructed so as to conceal both the edge of the picture, which is applied to the back of the plate, and the joint between the two sections of colored celluloid or other reinforcing used between the glass sheets. One embodiment of the invention is illustrated in the accompanying drawings, wherein:

Figure 1 is a face or plan view of the plate. Fig. 2 is a section on the line II—II of Fig. 1 with the layers of material much exaggerated as to thickness to permit of clearer illustration. Fig. 3 is a section through the front sheet of glass after the application of the rectangular metallic coating which serves to outline the picture. And Fig. 4 is a section similar to Fig. 3 through a modification.

Referring to the drawings, 1 is the front sheet of glass employed and 2 is the back sheet of glass. Upon the back of the sheet 1 is deposited the film or coating 3 of rectangular shape designed to outline the photograph which is to be used behind the plate. This may be an opaque paint or other equivalent material, but is preferably a metallic film of gold, silver, lead sulphide, or the like, deposited on the sheet by the usual methods well-known in the mirror art.

Between the sheets of glass is a reinforcing layer preferably of celluloid comprising the central portion 4 of colorless celluloid and the border portion 5 of colored celluloid arranged so that the joint 6 between the two portions lies behind and is concealed by the opaque band 3. The layer of celluloid is attached to the glass sheets by the layers 7, 7 of any suitable cement, such as gelatin. Such cement may be formed, however, by applying a solvent, such as acetone to the surfaces themselves. The sheets are composited in the usual way under heat and pressure and the holes 8, 8, 8, 8 drilled to provide means for securing the photograph or other picture to the back of the plate.

The metallic band 3 conceals the edge of the photograph, which is placed behind the plate and also conceals the joint 6, and adds greatly to the appearance of the plate. The glass may be made to appear to be bevelled along the inner edge of the band 3 by mitering the glass at this point, as indicated at 10 in Fig. 4. The sheet 1 may be ornamented by engraving or cutting its outer surface, as indicated at 9 (Fig. 1), or such engraving may be omitted or placed on the under surface of the plate, as indicated in Fig. 4, and such cut or engraved portion coated with metallic or other coloring material 11. It is further possible to add variety to the appearance of the article by decorating the inner or outer surfaces of the border portion of the sheet 1 in other ways, or by placing designs upon the border portion 5 of the celluloid by lithographing or other means.

While the invention has been described and illustrated as applied to a picture plate for use with a photograph or other picture, it also has a large use in ornamental composite glass not employing a picture. For instance, the plate may be used as a table top or a plaque, in which case the holes 8 will not be drilled and the central celluloid sheet 4 may be opaque and of any desired color instead of colorless and transparent, or such celluloid may be lithographed or otherwise ornamented. It is also possible, if desired, to decorate the rear surface of the glass sheet opposite the celluloid sheet 4 by deposited patterns, as set forth in our application, Serial No. 355,507. In all cases, however, the idea involved is the same, namely, the use of a reinforcing made of two or more sections of different colors, with a band or bands like the band 3 on the back of the front sheet of glass for concealing the joints between the sections.

What we claim is:

1. A plate of composite material comprising a front sheet of glass, a back sheet of glass, an interposed layer of reinforcing material secured to both sheets and comprising a plurality of sections of different colors arranged so as to give an ornamental appearance, and a band of relatively opaque material on the rear face of the front sheet of glass so as to overlie and conceal the joint between the two sections of reinforcing.

2. A plate of composite material comprising a front sheet of glass, a back sheet of glass, an interposed layer of reinforcing material secured to both sheets and comprising a plurality of sections of different colors arranged so as to give an ornamental appearance, and an opaque band comprising a deposited metallic film on the rear face of the front sheet of glass so as to overlie and conceal the joint between the two sections of reinforcing.

3. A picture plate comprising a front sheet of glass having on its rear face spaced away from the edge a band of relatively opaque material adapted to outline the picture to be used, a back sheet of glass, and an interposed layer of reinforcing secured to both sheets and comprising a colorless transparent center portion and a colored border portion with the joint between the two portions behind said band so as to be concealed thereby.

4. A picture plate comprising a front sheet of glass having on its rear face spaced away from the edge an opaque band comprising a deposited metallic film adapted to outline the picture to be used, a back sheet of glass and an interposed layer of reinforcing material cemented to both sheets and consisting of a colorless transparent center portion and a colored border portion with the joint between the portions behind said band so as to be concealed thereby.

5. A picture plate comprising a front sheet of glass having on its rear face spaced away from the edge an opaque metallic film adapted to outline the picture to be used, a back sheet of glass and an interposed layer of reinforcing material cemented to both sheets and consisting of a transparent center portion and a border portion of a color contrasting to the center portion with the joint between the two portions behind said band so as to be concealed thereby.

In testimony whereof, we have hereunto subscribed our names.

GEORGE F. COLBERT.
WM. H. COLBERT.